Dec. 15, 1925.
J. E. MILLER
1,566,158
METHOD OF AND APPARATUS FOR DECORATING ARTICLES OF PLASTIC MATERIAL
Filed March 28, 1925
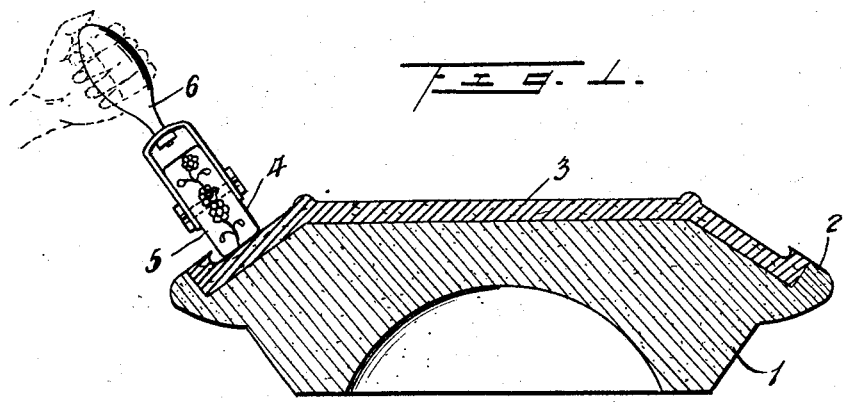
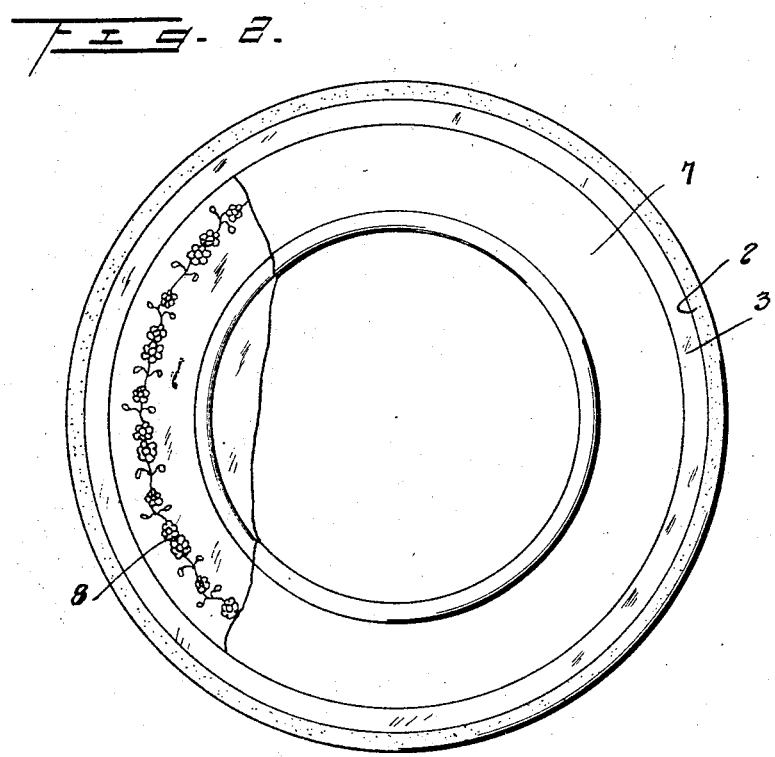
Inventor
J. E. Miller,
By
Attorney Patented Dec. 15, 1925.

1,566,158

UNITED STATES PATENT OFFICE.

JOHN EDWARD MILLER, OF HUNTINGTON, WEST VIRGINIA.

METHOD OF AND APPARATUS FOR DECORATING ARTICLES OF PLASTIC MATERIAL.

Application filed March 28, 1925. Serial No. 19,118.

*To all whom it may concern:*

Be it known that I, JOHN E. MILLER, a citizen of the United States, residing at Huntington, in the county of Cabell and State of West Virginia, have invented certain new and useful Improvements in Methods of and Apparatus for Decorating Articles of Plastic Material; and I do hereby declare the following to be a full, clear, and exact description of the invention, such as will enable others skilled in the art to which it appertains to make and use the same.

The invention relates to the art of molding articles of china-ware, porcelain, etc., and has for its object the provision of a means and a method by which decorations in relief may be molded on the article.

At the present time in the art of molding articles of china-ware and other plastic materials, where it is desired to have the article decorated in relief, it is the practice to etch the design on the wheel or jigger-head on which the article is molded. This process is quite expensive as the etching of the wheel or jigger-head takes considerable time and thus adds to the expense of the product. This invention contemplates reducing the expense of making decorated articles by providing a wax form for the articles and impressing the surface of the wax with the decoration desired and then forming the article on the wax form so impressed, the resultant product having the decorations in relief.

The invention will be described in detail hereinafter and an apparatus by which the method is carried out will be found illustrated in the accompanying drawings, in which—

Figure 1 is a central vertical sectional view of a jigger-head or wheel for forming a plate showing the wax mold thereon and a roller stamp making an impression therein of the design desired, and Figure 2 is a top plan view of the plate wheel with the molded plate in the mold partly broken away to show the decorated mold.

In the drawings similar reference characters will be used to designate corresponding parts in the two views.

As heretofore stated in the art of decorating articles of china-ware, porcelain, and other plastic materials, it has been customary to cut the decorations into the surface of the wheel or jigger-head so as to form the decorations in relief on the surface of the plate when molded.

This invention contemplates reducing the expense of producing articles with relief decorations and in the drawings an apparatus for molding plates is used to illustrate the invention. The decoration is accomplished by providing the jigger-head 1 for molding a plate with a shoulder 2 around its top edge, and filling the top surface of the jigger-head 1 with a layer of wax 3 held in place by the shoulder 2, and formed as shown in Figure 1 to mold the inside of a plate. In order to form decorations in relief on the plate, the decorations must be impressed into the surface of the layer of wax 3 and this may be most expeditiously and economically accomplished by means of a roller 4 having the decorations desired in relief on its surface as shown at 5, said roller being mounted for hand operation as shown in Figure 1 with a handle 6, or if desired the roller may be carried by any suitable machinery, not shown, the means for carrying the mold stamping mechanism not being a part of the invention involved herein.

After the mold is completed, as shown in Figure 1, and decorated with the roller 4, or other means for forming the decorations in intaglio in the wax surface, the material to form the plate in a suitable plastic condition is placed in the mold, and the plate will then be formed in the usual manner in the art. The completed plate is shown at 7 in Figure 2 partly broken away to disclose the decorated mold thereunder, the decorations of the mold being indicated at 8.

It will be apparent that other articles than plates may be decorated by the same process, it being necessary only to have the mold covered with the wax 3 and then impressing the decoration into the wax as shown and described above.

What is claimed is:—

1. In the method of decorating articles made of plastic material, forming the article mold by providing a jigger-head with a layer of plastic material shaped to form the article, and then impressing a decoration into the surface of said plastic material.

2. The method of forming relief decorations on articles made of plastic material consisting of coating a jigger-head with plastic material, then shaping said plastic material to form a mold for the article, then impressing the surface of said plastic material with a decoration in intaglio, and finally forming the article on said mold.

3. A plate molding apparatus comprising in combination with a jigger-head having its top surface formed to shape the inside of a plate, a shoulder around the edge of said top surface, a layer of wax on said top surface and held in position therein by said shoulder, and means to impress decorations in the said layer of wax to form integral relief decorations on the plate when molded.

In testimony whereof I affix my signature.

JOHN EDWARD MILLER.